Jan. 12, 1926.  
C. A. WILLMARTH  
PEAT DRYING MACHINE  
Filed Nov. 16, 1923

Inventor  
Charles A. Willmarth  
By  
Attorneys

Jan. 12, 1926.                          1,569,345
C. A. WILLMARTH
PEAT DRYING MACHINE
Filed Nov. 16, 1923        3 Sheets-Sheet 2

Inventor:
Charles A. Willmarth
By
Attorneys

Jan. 12, 1926.  1,569,345

C. A. WILLMARTH

PEAT DRYING MACHINE

Filed Nov. 16, 1923   3 Sheets-Sheet 3

Inventor:
Charles A. Willmarth
By
Attorneys

Patented Jan. 12, 1926.

1,569,345

UNITED STATES PATENT OFFICE.

CHARLES A. WILLMARTH, OF TECUMSEH, MICHIGAN.

PEAT-DRYING MACHINE.

Application filed November 16, 1923. Serial No. 675,200.

*To all whom it may concern:*

Be it known that I, CHARLES A. WILL-MARTH, a citizen of the United States, residing at Tecumseh, in the county of Lenawee and State of Michigan, have invented certain new and useful Improvements in Peat-Drying Machines, of which the following is a specification, reference being had therein to the accompanying drawings.

This invention relates to a peat drying machine that may be advantageously used in the preparation of stock food or fertilizer from peat.

In the drying of peat to prepare it as a fertilizer, great care must be taken not to overheat the peat as it will burn or carbonize long before it has reached the desired dryness for fertilizer purposes. If carbonized or too thoroughly dried the peat will not absorb or hold the moisture; it will not prevent other ingredients from leaching, and it will not flocculate the soil so that the valuable elements would not be available in the soil. It is therefore necessary that in drying peat great care must be taken in removing the requisite amount of moisture and yet not carbonize the peat during the process of drying.

As the peat is a formation of decayed vegetation it is valuable as a stock food when properly carbonized, for it contains approximately eighteen per cent protein. When carbonized it has the property of absorbing large quantities of liquid matter used in the making of the food, for instance, the residue or molasses obtained from sugar beets or cane sugar factories. When the carbonized peat is laden with such ingredients it makes a valuable ration for live stock and has proven to be a corrective and preventative for diseases, without any danger of overfeeding.

My invention aims to provide a peat drying machine which may be operated to expeditiously and economically produce partially dried peat for fertilizer purposes or completely dry and carbonize peat for stock food purposes, and the drying may be accomplished without any danger of a conflagration.

My invention further aims to provide a peat drying machine wherein the peat is continuously shifted through drying zones and the movement of the peat is regulated according to the degree of dryness desired, either for a fertilizer or a food. In the latter instance provision is made for introducing molasses or any other ingredient so that the product of the machine is complete as a ration for live stock.

My invention further aims to provide a machine wherein a series of stationary drums are arranged to be subjected to the products of combustion of a furnace or other heating apparatus and in the drums are conveyors or devices by which peat may be continuously shifted in the drums to prevent burning. Communication is established between the drums so as to provide a continuous sinuous path of travel for the peat, thus permitting of the drying or carbonization of the peat being continuously carried on.

My invention will be hereinafter specifically described and then claimed, and reference will now be had to the drawings, wherein—

Fig. 2 is a front elevation of the same showing the section line I—I on which Fig. 1 is taken;

Figure 1:
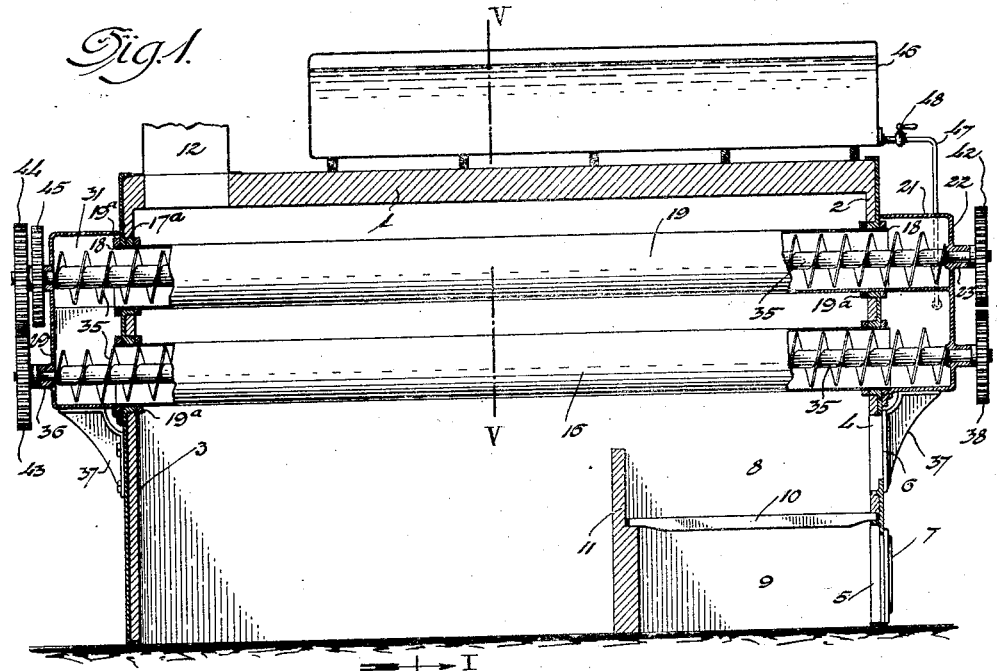
Figure 1 is a longitudinal sectional view of the drying machine;
Figure 2:
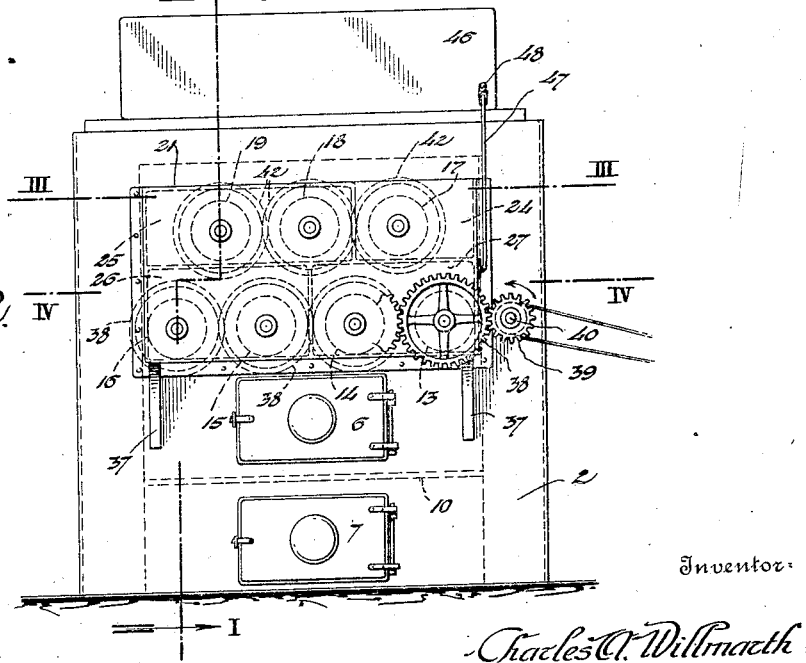
Figure 3:
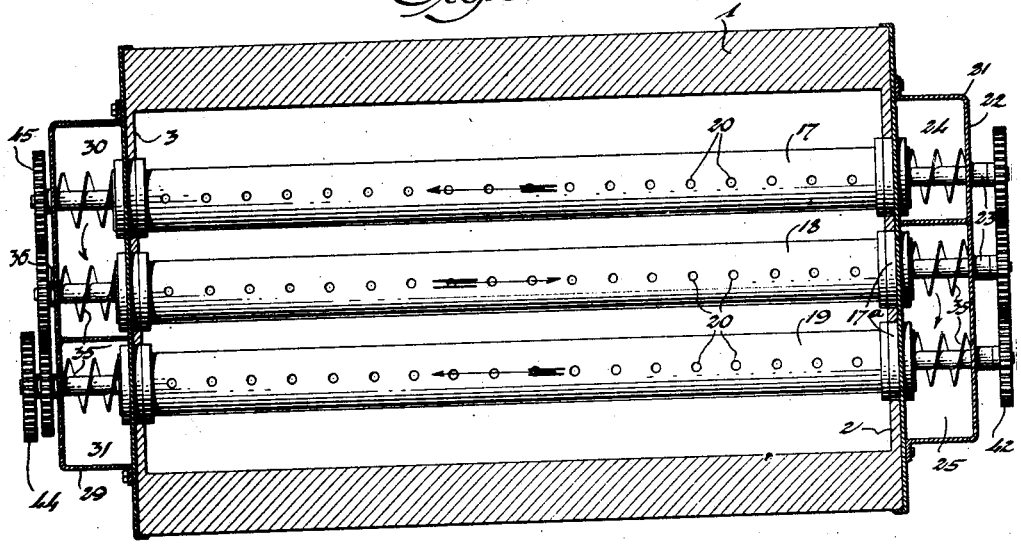
Fig. 3 is a horizontal sectional view taken on the line III—III of Fig. 2;
Figure 4:
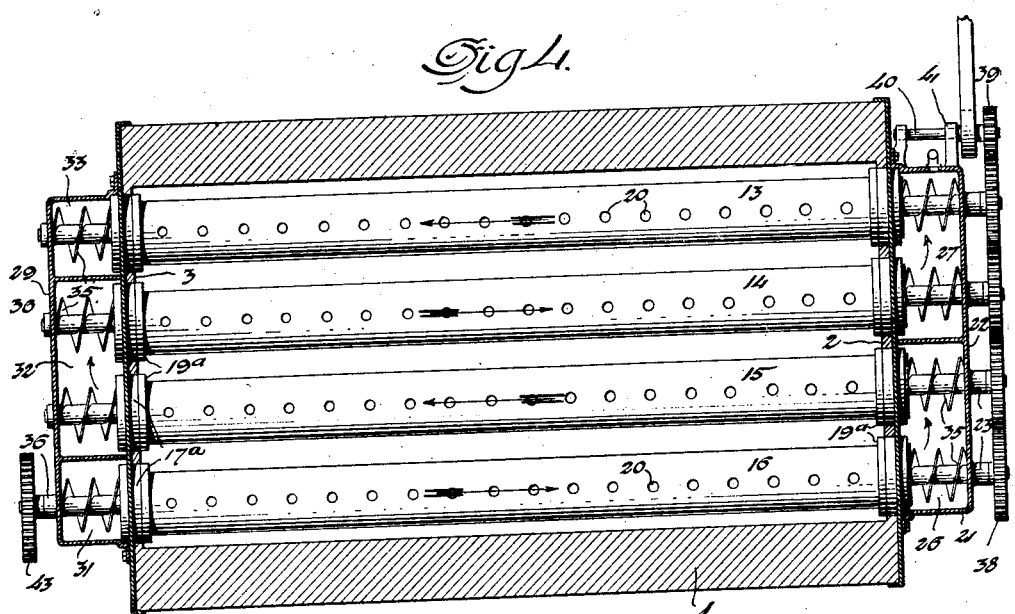
Fig. 4 is a horizontal sectional view taken on the line IV—IV of Fig. 2.
Figure 5:
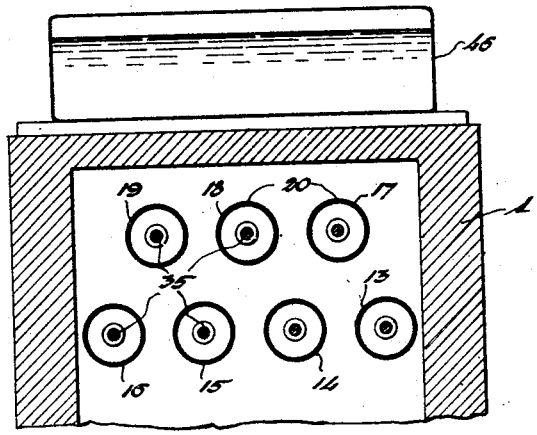
Fig. 5 is a vertical cross sectional view taken on the line V—V of Fig. 1.
Figure 6:
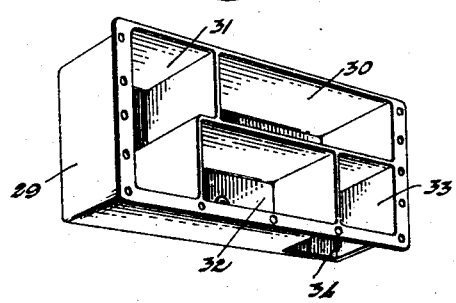
Fig. 6 is a perspective view of a detached outlet compartment head of the machine.
Figure 7:
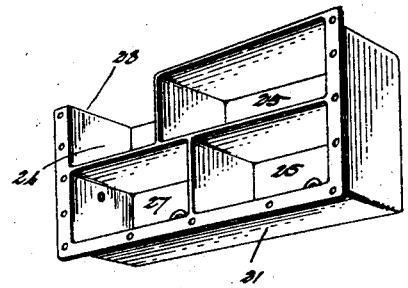
Fig. 7 is a similar view of a detached inlet compartment head of the machine.
Figure 8:
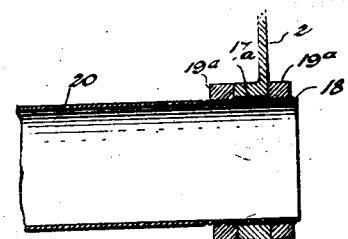
Fig. 8 is a longitudinal sectional view of a portion of the machine showing the manner of mounting a drum therein.

In the drawings, the reference numeral 1 denotes a furnace or heating apparatus having a front wall 2 and a rear wall 3. In the lower part of the front wall 2 are doorways 4 and 5 provided with doors 6 and 7 respectively, the former providing an entrance to a combustion chamber 8 and the latter to an ash pit 9, said chamber and pit being divided by a grate 10 supported by the wall 2 and a bridge or baffle wall 11 in the furnace. A fire may be maintained in the combustion chamber 8 and at the top of the furnace or heating apparatus, adjacent the rear wall 3, is an exhaust stack or flue 12.

Mounted in the front and rear walls 2 and 3 are two superposed series of drums or tubular conduits, the drums 13, 14, 15 and 16 of one series being disposed in a horizontal plane below the drums 17, 18 and 19 of the other series, with the drums of the uppermost series staggered relative to the drums of the lowermost series, so that the former may baffle products of combustion passing upwardly between the drums of the lowermost series and since the latter drums are in a plane below the upper drums there will be a more intense heating zone for the lower series of drums. The drums may be held stationary by providing the walls 2 and 3 with apertured bosses 17ª through which screwthreaded ends 18 of said drums may extend and on the screwthreaded ends of said drums may be mounted nuts 19ª for anchoring the drums relative to the walls 2 and 3. The upper walls of said drums may be provided with a series of apertures or vents 20 for the escape of steam or gases liberated during the drying process.

Mounted on the front wall 2 at the open ends of the drums of both series is an inlet compartment head 21 having an outer wall 22 provided with bearings 23 and in the head are partitions dividing the head into compartments 24, 25, 26 and 27 with the compartment 24 provided with an inlet opening 28 so that peat may be placed in the compartment to enter the front end of the drum 17. The compartment 25 establishes communication between the front ends of the drums 18 and 19; the compartment 26 establishes communication between the front ends of the drums 15 and 16, and the compartment 27 establishes communication between the front ends of the drums 13 and 14.

Mounted on the rear wall 3 at the open ends of the series of drums is an outlet compartment head 29 provided with partitions dividing the head into compartments 30, 31, 32 and 33, the latter having a discharge opening 34. The compartment 30 establishes communication between the rear end of the drums 17 and 18; the compartment 31 establishes communication between the rear ends of the drums 19 and 16; the compartment 32 establishes communication between the rear ends of the drums 14 and 15 and the discharge compartment 33 communicates with the rear end of the drum 13. It is now apparent that peat or other material placed in the compartment 24 may be carried through the drum 17 to the compartment 30, through the drum 18 into the compartment 25, through the drum 19 into the compartment 31, through drum 16 into compartment 26, through drum 15 into compartment 32, through drum 14 into compartment 27, and through drum 13 into the discharge compartment 33.

To cause peat or other material to travel in such a sinuous path through the series of drums, I provide each drum with a spiral or screw conveyor 35. The forward end of each conveyor is journaled in one of the bearings 23 of a compartment head 21 and the rear end of each conveyor is journaled in a bearing 35 of the compartment head 29. These compartment heads in addition to being attached to the walls 2 and 3 may be supported by brackets 37.

On the forward ends of the conveyors 35 of the lower series of drums are meshing gear wheels 38 arranged as a train to be driven from a gear wheel 39 on a shaft 40 journaled in brackets 41, carried by one side of the inlet compartment head 21. The shaft 40 may be driven directly or indirectly from any suitable source of power.

Above the train of gear wheels 38 is another train of meshing gear wheels 42 establishing a driving relation between the forward ends of the conveyors 35 of the upper series of drums.

On the rear end of the conveyor 35 of the drum 16 is a gear wheel 43 transmitting power to a gear wheel 44 on the rear end of the conveyor 35 of the drum 19 and the rear ends of the conveyors in the drums 17, 18 and 19 support a train of gear wheels 45 so that the conveyors of both series of drums may be driven in synchronism from the driven shaft 40. With the conveyors extending into the compartments of the heads 21 and 29 the peat or material placed in the machine can be caused to travel in a sinuous path therethrough and the speed at which the conveyors are driven may be regulated according to temperature conditions within the furnace or heating apparatus, the speed of the conveyors being increased for high temperatures and decreased for low temperatures, also regulated according to the degree of dryness for the peat. As brought out in the beginning the drying of peat for a fertilizer is not as extensive as that for a food.

In order that molasses or other ingredients can be mixed with peat during a drying process, a tank or receptacle 46 may be conveiently mounted on top of the furnace or heating apparatus and connected by a pipe 47 to either of the compartments of the inlet head 21, preferably the compartment 27 so that the liquid ingredient may commingle with the peat at that stage or step in the drying process where it will adhere to or be absorbed by the peat prior to its discharge from the machine. The pipe 47 has a suitable control valve 48 and while the tank 46 represents a receptacle for liquid, it is obvious that other types of receptacles may be used for delivering various kinds of ingredients to either of the compartment heads for admixture with the peat at different stages of the drying process.

It is obvious that a temperature controlled speed regulator may be associated with the drying machine so that the machine may be set and automatically controlled for producing food or fertilizer, and while in the drawings there is illustrated a preferred embodiment of my invention, it is to be understood that the structureal elements are susceptible to such variations and modifications as fall within the scope of the appended claims.

What I claim is:—

1. A peat drying machine comprising a heating apparatus having end walls, series of peat drying drums having the ends thereof extending through the end walls of said apparatus with one series of drums in a horizontal plane above the other series of drums and the upper series of drums having an inlet, and means for causing peat to travel in said drums in a sinuous path so that the peat may be progressively dried.

2. A peat drying machine as called for in claim 1, wherein said means includes heads at the ends of drums and conveyors in said drums, said heads being mounted on said end walls outside of said heating apparatus.

3. Means for drying peat comprising a series of parallel drums, heads at the ends of said drums having a configuration to establish communication between the drums of one series, the drums of the other series, and a drum of each series so as to form a continuous passage to cause peat to move first in one horizontal plane and then in another, heating means for said drums, and means for conveying peat through the continuous passage formed by said heads and said drums.

4. A peat drying machine comprising a heating apparatus, having walls, compartment heads on said walls, an upper series of horizontal drums having open ends protruding through said walls into said heads, a lower series of horizontal drums having open ends extending through said walls into said compartment heads, said heads establishing communication between said drums, one of the upper and lower series of heads having a discharge opening and the other head an inlet opening, and conveyors in said drums.

In testimony whereof I affix my signature.

CHARLES A. WILLMARTH.